Oct. 4, 1966  T. F. SARAH  3,276,160

FISHING ROD HANDLE

Filed April 8, 1964

INVENTOR.
THOMAS F. SARAH
BY Hamilton & Cook
ATTORNEYS

United States Patent Office 3,276,160
Patented Oct. 4, 1966

3,276,160
FISHING ROD HANDLE
Thomas F. Sarah, Akron, Ohio, assignor to Pflueger Corporation, Akron, Ohio, a corporation of Ohio
Filed Apr. 8, 1964, Ser. No. 358,329
7 Claims. (Cl. 43—22)

The present invention relates generally to fishing rod handles. More particularly, the present invention relates to fishing rod handles adapted to mount a reel thereon. Specifically, the present invention relates to a fishing rod handle adapted to retain a reel securely in position, even when dropped.

The historic prior art construction for attaching a reel to a rod handle included a clamping means which was located so closely to the reel that mounting and demounting the reel was difficult because of the limited access to the clamping means.

This disadvantage was obviated by the advent of fishing rod handles constructed to engage the mounting shoe of a reel carried thereon by a spring actuated clamping means.

However, it has been found that there is one major disadvantage attendant upon the use of spring biased clamping means constructed according to the teachings of the prior art. When the fisherman either purposely or accidentally lets the rod slip through his fingers until the butt of the handle makes contact with the dock, boat or other surface upon which the fisherman is standing, as generally occurs when baiting the hook or changing lures, the reel often becomes disengaged from the handle. This undesirable result is occasioned because the reel tends to continue its downward motion even after the rod has been stopped. That is, the inertia of the reel acts contra the biasing force of the spring loaded clamping means, thus disengaging the mounting shoe and permitting the reel to become released from the rod handle.

It is therefore the primary object of the present invention to provide a fishing rod handle having a spring biased clamping means for mounting a rod thereon which will not accidentally disengage from the mounting shoe when the rod is dropped on the butt of the handle.

It is another object of the present invention to provide a fishing rod handle, as above, which is simple in construction and easily operable to mount and demount a reel thereon with one hand.

It is a further object of the present invention to provide a fishing rod handle, as above, upon which can be mounted reels of varying size with equal facility.

These and other objects of the invention, as well as the advantages thereof over existing and prior art forms, will be apparent in view of the following detailed description and the attached drawings and are accomplished by means hereinafter described and claimed.

One preferred embodiment is shown by way of example in the accompanying drawings and hereinafter described in detail without attempting to show all the various forms and modifications in which the invention might be embodied; the invention being measured by the appended claims and not by the details of the specification.

Figure 1:
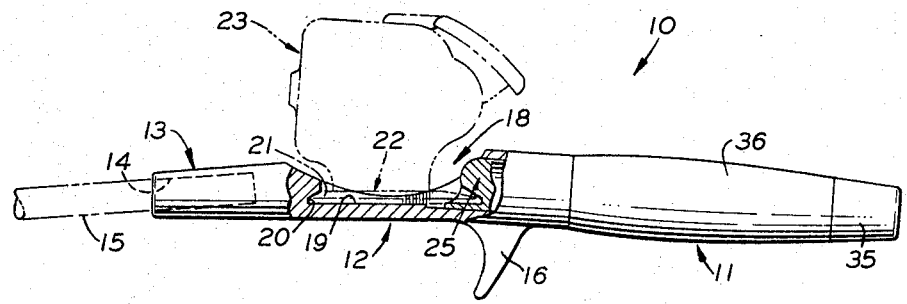
FIG. 1 is a side elevation of a fishing rod handle according to the present invention and showing, in phantom, a reel mounted thereon.
Figure 2:
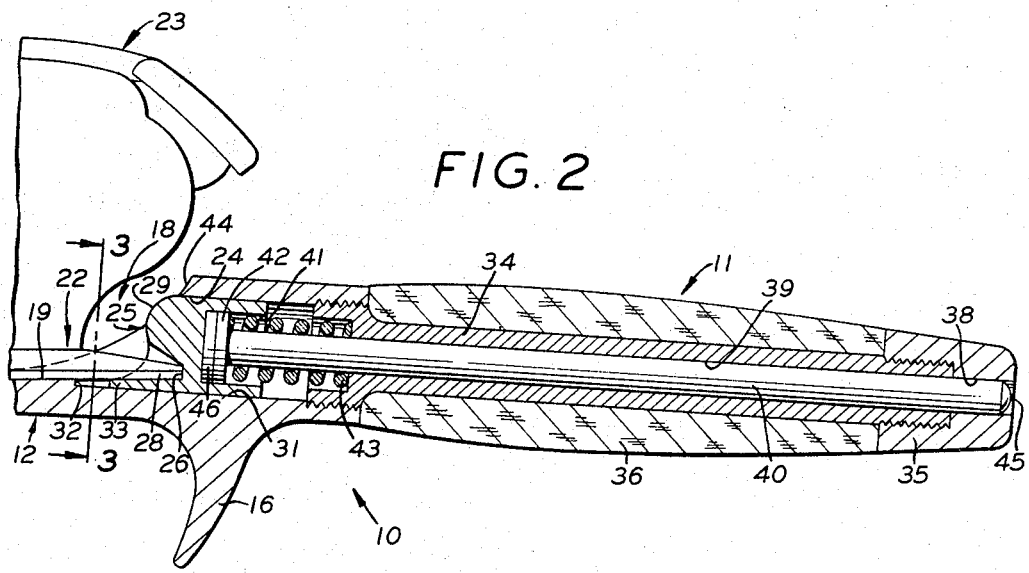
FIG. 2 is an enlarged section through a portion of the handle depicted in FIG. 1.
Figure 3:
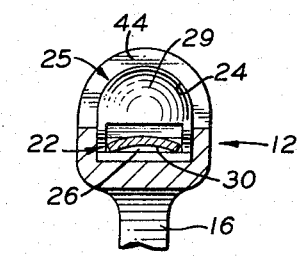
FIG. 3 is a cross section taken substantially on line 3—3 of FIG. 2.

In general, a fishing rod handle according to the concept of the present invention has a gripping portion, a reel seating portion and a rod receiving portion. The reel seating portion has a pocket at the forward end to engage one end of the reel shoe and a spring biased clamping block at the rear thereof to engage the other end of the reel shoe. Extending rearwardly from the clamping block through a hollow guide in the gripping portion is an inertia rod which preferably terminates at the plane of the handle butt.

Referring particularly to the drawings, the improved fishing rod handle, indicated generally by the numeral 10, comprises a gripping portion 11, a reel seating portion 12 and a rod receiving portion 13. The reel seating portion 12 and the rod receiving portion 13 are preferably integrally formed of a strong, lightweight material, such as aluminum, with an axial bore 14 in the forward end of the rod receiving portion 13 into which the base of the rod 15 may be insertably positioned. A frictional engagement between the rod 15 and the bore 14 has been found to be satisfactory to retain the rod, though other means may be utilized, as desired.

The reel seating portion 12 has an outwardly directed finger grip 16 on one side and a recessed seat 18 on the diametrically opposed side. The seat 18 has a preferably flat base 19 terminating in a notch, or pocket, 20 on the forward end undercut into the body of the seating portion 12. Pocket 20 is adapted to engage the toe, or forward end, 21 of the mounting shoe 22 on a reel 23.

At the opposite end of the recessed seat 18 is an axially aligned passage 24 forming a continuation of the seat 18 and in which a clamping block 25 is reciprocably, slidably received.

On the forward side of the clamping block 25 is a notch, or pocket, 26 similar to and opposing pockets 20, which is adapted to engage the heel, or rearward end 28 of the reel mounting shoe 22. Above this pocket 26 the clamping block 25 is formed in a convexly rounded cam surface 29. This convexity of cam surface 29 provides a guiding action to the generally arcuate undersurface 30 of the mounting shoe 22 when the reel is being mounted, as more fully hereinafter explained.

The flat base 19 of seat 18 intersects the flat base 31 of the passage 24, which is offset therefrom, by a rearwardly directed stop shoulder 32 against which the toe 33 of the clamping block 25 engages to limit forward movement thereof and thereby prevent the clamping block 25 from sliding forwardly and out of passage 24 into seat 18.

The axial extent of the passage 24 controls the amount of rearward movement of the clamping block 25 therein. The axial extent of passage 24 is preferably sufficient to permit the mounting of reels having mounting shoes of various lengths.

At the rear of the passage 24 is mounted a hollow guide 34, as by the threaded connection shown. A butt piece 35 is in turn attached to the rear of the guide 34 to secure an annular cork grip 36 which encases the guide 34 to form the gripping portion 11. As shown, the butt piece 35 may be attached to the guide 34 by a threaded connection to facilitate changing the grip 36, as desired. In any event, the butt piece 35 is also provided with a through bore 38 axially aligned with the bore 39 through the guide 34.

The aligned bores 38 and 39 slidably receive an inertia rod 40 operably connected to the rear of the clamping block 25. While this operable connection may also be a threaded connection it has been found to be most satisfactory to provide a blind bore 41 on the rear of the block 25 into which is slidably received a head 42 on the forward end of the inertia rod 40. A helical compression spring 43 is positioned concentrically around the inertia rod 40 between the head 42 and the hollow guide 34 which continuously urges the inertia rod 40, head 42 and clamping block 25 forwardly toward the recessed seat 18. It is this biasing action which engagingly grips the mounting shoe 22 on reel 23.

To mount a reel on handle 10 the gripping portion 11 is firmly grasped in one hand and the reel 23 in the other hand. The toe 21 of the reel mounting shoe 22 is seated in pocket 20 and the arcuate undersurface 30 of the shoe 22 in proximity to heel 28 is positioned on top of the convex cam surface 29 on clamping block 25. Pressure applied to the top of the reel transversely the longitudinal axis of the handle 10 will cause the clamping block 25 to move rearwardly against the action of spring 43 until the heel 28, guided by the convex cam surface 29, swings past the upper lip 44 of the recessed seat 18 and snaps into pocket 26. The forwardly biasing action of spring 43 retains the reel in the handle.

The reel is preferably mounted on the handle in such a fashion that the rear terminal 45 of inertia rod 40 is coplanar with the rearmost end of butt piece 35. Accordingly, when the rod is dropped on the butt of the handle, the downward inertia force of the reel is opposed by the contact of terminal 45 with whatever object the butt piece 35 strikes. By thus preventing the inertia rod 40 and the clamping block 25 from moving downwardly away from seat 18, the reel can not become disengaged from the handle.

On some reels the reel shoe is so short that the terminal 45 may lie too far inwardly from the plane of the end of the butt piece 35, when the reel is mounted on handle 10. In that situation the downward motion of the clamping block 25 would not be resisted until the clamping block was sufficiently displaced from pocket 20 to release the reel shoe 22. In this event the fisherman removes the gripping portion 11, by unscrewing the guide 34 from the seating portion 12, and removes the inertia rod 40 in spring 43. A shim, or extension means, 46 can then be positioned within the blind bore 41 and the head 42 reinserted. Thereafter the spring 43 is properly positioned, and the gripping portion 13 is screwed back in place. The rod handle is thereby adapted to insure that the reel having the undersized shoe will not become inadvertently disengaged. It is readily apparent that the thickness of shim 46 must be sufficient to bring terminal 45 substantially coplanar with the butt of handle 11 in order to permit the above described function of inertia rod 40.

To remove reels of any size, the gripping portion 11 is grasped firmly by one hand and the other hand grasps the reel. The reel is moved rearwardly to compress the spring 43 by the action of the shoe heel 28 against the clamping block 25 until the toe 21 can swing clear of pocket 20 and past the forward end of the seat 18.

The improved fishing rod handle disclosed thus permits facile mounting and demounting of reels of various sizes; insures that they can not become disengaged when a rod is dropped on the butt of the handle; and, otherwise accomplishes the objects of the invention.

What is claimed is:

1. A fishing rod handle comprising, a gripping portion at the rear end of said handle, a rod receiving portion at the forward end of said handle, and a reel seating portion intermediate said gripping and rod receiving portions, a bore longitudinally through said gripping portion communicating with said seating portion, said reel seating portion having a seat with a pocket at the forward end adapted to receive the toe of a reel mounting shoe, a clamping block at the rearward end of said seat having a pocket adapted to receive the heel of a mounting shoe, spring means urging said clamping block forward, an inertia rod operably connected to said clamping block and extending rearwardly through the bore in said gripping portion, said inertia rod having a terminal, said terminal being positioned wholly within said bore and substantially coplanar with the rearmost end of said gripping portion when a reel is mounted on said handle.

2. A fishing rod handle comprising, a gripping portion at the rear end of said handle, a rod receiving portion at the forward end of said handle, and a reel seating portion intermediate said gripping and rod receiving portions, a bore longitudinally through said gripping portion communicating with said seating portion, said reel seating portion having a seat with a pocket at the forward end adapted to receive the toe of a reel mounting shoe, a clamping block at the rearward end of said seat having a pocket on the forward side thereof adapted to receive the heel of a reel mounting shoe, a blind bore on the rearward side of said clamping block, an inertia rod, a head on the forward end of said inertia rod and a terminal on the rearward end, said head insertably positioned in said blind bore with said inertia rod extending rearwardly therefrom through the bore in said gripping portion, spring means urging said clamping block and inertia rod forwardly, said terminal being positioned wholly within said bore and substantially coplanar with the rearmost end of said gripping portion when a reel is mounted on said handle.

3. A fishing rod handle, as set forth in claim 2, in which shim means are selectively insertable in said blind bore ahead of said head.

4. A fishing rod handle comprising, a rod receiving portion at the forward end of said handle, a reel seating portion rearwardly of said rod receiving portion, a reel seat recessed in said seating portion, said seat having a flat base with a pocket at the forward end thereof adapted to receive the toe of a reel mounting shoe, a substantially longitudinal passage extending rearwardly from said seat through said seating portion, a clamping block slidably received in said passage, a gripping portion demountably secured to the rear of said reel seating portion, a bore longitudinally through said gripping portion, a pocket on the forward side of said clamping block adapted to receive the heel of a reel mounting shoe, an inertia rod operably connected to the opposite side of said clamping block and extending rearwardly through the bore in said gripping portion, spring means continuously biasing said inertia rod and clamping block forwardly, a terminal at the rearmost end of said inertia rod, said terminal being positioned wholly within said bore and substantially coplanar with the rearmost end of said gripping portion when a reel is mounted on said handle.

5. A fishing rod handle, as set forth in claim 4, in which there is an offset shoulder in said seat base, a toe beneath the pocket in said clamping block engageable with said offset shoulder to limit the forward travel of said clamp block, and in which there is an extension means between said clamping block and said inertia rod.

6. A fishing rod handle, as set forth in claim 5, in which there is a convex cam surface above the pocket in said clamping block.

7. A fishing rod handle, as set forth in claim 5, in which the operable connection between said clamping block and said inertia rod comprises a blind bore in said clamping block and a head on said inertia rod positioned therein, and in which the extension means comprises one or more shims selectively insertable in said blind bore ahead of said head.

References Cited by the Examiner

UNITED STATES PATENTS 2,182,901   12/1939   Moulton _____ 43—22
2,289,216   7/1942    Seidel _____ 43—22

OTHER REFERENCES

Schreiber: German printed application, No. S 43,880, pub. June 28, 1956 (2 pp. spec.; 1 sheet dwg.).

SAMUEL KOREN, *Primary Examiner.*

D. J. LEACH, *Assistant Examiner.*